(12) United States Patent
Bianco

(10) Patent No.: US 6,348,534 B1
(45) Date of Patent: Feb. 19, 2002

(54) GEL TOY

(76) Inventor: Michael Bianco, 1625 Crown Ridge Ct., Westlake Village, CA (US) 91362

( * ) Notice: Subject to any disclaimer, the term of this patent is extended or adjusted under 35 U.S.C. 154(b) by 0 days.

(21) Appl. No.: 09/595,785

(22) Filed: Jun. 16, 2000

(51) Int. Cl.[7] .............................. C08K 5/06; C08K 3/32; A63N 33/04
(52) U.S. Cl. ...................... 524/400; 524/17; 524/378; 524/414; 523/102; 446/75; 446/486
(58) Field of Search .................... 446/75, 486; 523/102; 524/17, 378, 400, 414, 56

(56) References Cited

U.S. PATENT DOCUMENTS

| | | |
|---|---|---|
| 3,634,280 A | 1/1972 | Dean et al. |
| 3,661,790 A | 5/1972 | Dean et al. |
| 4,076,547 A | 2/1978 | Lester et al. |
| 4,735,660 A | 4/1988 | Cane |
| 5,157,063 A | 10/1992 | Wetherell |
| 5,171,766 A | 12/1992 | Mariano et al. |
| 5,258,068 A * | 11/1993 | Shapero et al. .......... 106/205.2 |
| 5,310,421 A | 5/1994 | Shapero et al. |
| 5,364,892 A | 11/1994 | Miller et al. |
| 5,498,645 A | 3/1996 | Mariano et al. |
| 5,506,280 A | 4/1996 | Miller et al. |
| 5,506,290 A | 4/1996 | Shapero et la. |
| 5,810,640 A | 9/1998 | Clarke et al. |
| 5,916,949 A | 6/1999 | Shapero et al. |
| 5,972,092 A | 10/1999 | Cordova |
| 5,990,205 A * | 11/1999 | Cordova ....................... 524/55 |

OTHER PUBLICATIONS

Article "Tested Demonstrations" (Journal of Chemical Education—Madison, WI—vol. 54, No. 2, Feb., 1977—pp. 110–111).
Article "Dramatization of Polymeric Bonding Using Slime" (Journal of Chemical Education: Software—Madison, WI—vol. 63, No. 1, Jan. 1986—pp. 60–61).
Article "Gelatin as a Physically Crosslinked Elastomer" (Journal of Chemical Education: Software—Madison, WI—vol. 6, No. 3, Mar. 1985—pp. 269–270).
Article "The Gelation of Polyvinyl Alcohol With Borax" (Journal of Chemical Education: Software—Madison, WI—vol. 63, No. 1, Jan., 1986—pp. 57–60).

* cited by examiner

Primary Examiner—Kriellion A. Sanders
(74) Attorney, Agent, or Firm—Gottlieb, Rackman & Reisman, P.C.

(57) ABSTRACT

Provided is a toy that includes at least one insert suspended in a transparent play material matrix, especially a play gel. Also disclosed is a play material composition that includes water, polyvinyl alcohol, a surfactant, and a salt. The present invention further provides a play kit that includes a portion of a play material according to the invention and a container for the play material, especially including one or more inserts or sets of inserts.

46 Claims, No Drawings

GEL TOY

FIELD OF THE INVENTION

The invention relates generally to play materials for children. More particularly, the invention concerns a resilient play gel for children that can be deformed and stretched.

BACKGROUND OF THE INVENTION

Molding and play materials of various kinds are known in the toy arts for amusement and creative play. Such play materials in general are free-forming, malleable compositions that may be manipulated and shaped according to the whim of the user. Among these materials are gel-like toys that have interesting combinations of properties, such as elasticity and extensibility. Play materials meant for children are composed of non-toxic ingredients that, additionally, are non-irritating to the skin and eyes.

Various play material compositions have been proposed. Cordova, U.S. Pat. No. 5,990,205, discloses a gel play material including polyvinyl alcohol, polyvinyl pyrrolidone, a boron oxide compound or zirconium salt crosslinker, a polysaccharide gum thickener, an emollient and humectant, and up to 65% water by weight. The Cordova patent teaches that compositions with more than 65% water are "free-flowing and gooey." Shapero, U.S. Pat. No. 5,506,290, describes a moldable composition containing polyvinyl alcohol, 25–65% by weight of an emollient and humectant, a boron oxide compound or zirconium salt as a crosslinking agent, an amorphous silica, up to 40% water, and a cellulosic material or gum as thickener. The high level of humectant and low level of water are used to minimize water loss and make re-hydration easier. The Shapero patent teaches that the amorphous silica hydrogen bonds the polyvinyl alcohol gel to provide cohesion and strength. Shapero et al., U.S. Pat. No. 5,310,421 and 5,258,068 provide play materials based on guar gum and sodium alginate. Lester et al., U.S. Pat. No. 4,076,547 describes a molding materials based on a starch, modified starch, modified cellulosic, protein gum, or water soluble acrylic, polyvinyl alcohol, or polyether.

Play materials when used in play are stretched, formed, bounced, and manipulated in many ways. It would be desirable to have a play material that is unusually extensible or has other interesting or amusing properties that engage the interest of children.

SUMMARY OF THE INVENTION

The present invention provides an aqueous play gel composition containing water, polyvinyl alcohol, a surfactant, and a salt. The play gel is extremely extensible. Moreover, the play gel can be formulated with an unusually high water content, providing a reduced materials cost in manufacturing the play material compared to other play materials while maintaining the gel properties. Further, the play material can be kneaded, molded, and stretched, can be colored and/or scented, and can have other interesting colors or effects, such as glowing in the dark, changing colors with temperature or light changes, changing from transparent to opaque or from clear to colored with temperature or light changes, sparkling, being pearly, being magnetic, and so on.

The present invention further provides a play kit that includes a portion of a play material according to the invention and a container for the play material. Still further, the play kit may include the container and two or more portions of play material, each portion having a distinct property, such as being differently colored or scented or having a different property such ability to glow in the dark, change colors, and so on.

The invention still further provides a play material toy including one or more solid shapes, referred to herein as "inserts," suspended in a transparent play material such as a play gel. The inserts are distinct from the play gel material can be removed from the gel and re-inserted into the gel.

Additionally, the invention provides a play kit that includes a container, a play gel, and one or more inserts. The elements of the play kit can be related to a single theme. In another embodiment, the play kit can include more than one set of inserts, with each set of inserts being related to a distinct theme or to a distinct sub-theme that conforms to or suggests a broader theme of the container and/or play kit as a whole. By saying that the inserts are related to a distinct theme it is meant that the shapes, colors, or other attribute of the inserts have a common subject or motif, such as a set of inserts shaped like items of food, or a set of inserts shaped and scented like different kinds of flowers, or a set of inserts having different geometric shapes.

The play material of the invention has a high water content and retains water over a long period of play time to provide a long play life. The play material also has a high clarity that is desirable for providing clean, bright colors and special effects for the play materials.

In a different aspect, the play material of the invention provides amusing play qualities by including one or more shaped inserts.

DETAILED DESCRIPTION OF THE INVENTION

The play material of the present invention includes poly(vinyl alcohol), a surfactant, a salt, and water. The poly(vinyl alcohol) is preferably at least about 79 percent hydrolyzed, more preferably at least about 87 percent hydrolyzed. The poly(vinyl alcohol) may be up to fully hydrolyzed. Grades of poly(vinyl alcohol) that are fully hydrolyzed (typically 98% hydrolyzed or more) may need to be dissolved in hot or boiling water, but once dissolved remain soluble when cooled to room temperature. The poly(vinyl alcohol) may have a nominal degree of polymerization of from about 550 to about 2200 or more. The poly(vinyl alcohol) preferably has a degree of hydrolysis of at least about 87%, more preferably at least about 88%, still more preferably at least about 96%, and even more preferably at least about 98%. The poly(vinyl alcohol) preferably has a weight average molecular weight in the range of from about 10,000 to about 200,000, more preferably a weight average molecular weight of at least about 50,000, still more preferably a weight average molecular weight of at least about 85,000. More highly hydrolyzed or higher molecular weight grades of poly(vinyl alcohol) can be incorporated into the water of the play material by heating the water and stirring the poly(vinyl alcohol) in the water until dissolved. The water can be heated, for example and without limitation, to a temperature in the range of about 150° F. to boiling.

The play material preferably includes at least about 1% by weight, preferably at least about 5% by weight, and more preferably at least about 10% by weight of the poly(vinyl alcohol). Also preferred are play materials that include up to about 30% by weight, especially up to about 25% by weight, and particularly up to about 20% by weight of poly(vinyl alcohol). The play material preferably includes from about 1 to about 30 percent by weight of the poly(vinyl alcohol), more preferably from about 5 to about 25 percent by weight of the poly(vinyl alcohol), and still more preferably from about 10 to about 20 percent by weight of the poly(vinyl alcohol).

The play material according to the invention also includes at least one surfactant. The surfactant is (or, if more than one, each surfactant is) preferably nonionic and nontoxic. Examples of useful surfactants include, without limitation, soya lecithin; polyoxyethylene monoesters of fatty acids such as polyoxyethylene (40) stearic acid monoesters; polyoxyethylene ethers of fatty alcohols such as polyoxyethylene (12) lauryl alcohol ether; polyethoxylated sorbitan esters, especially polyethoxylated sorbitan monoesters such as monooleates, monolaurates, monopalmitates, monostearates, and monolinoleates, such as polyoxyethylene (20) sorbitan monooleate; polyoxyethylene ethers of monoesters of polyols such as polyethylene oxide (25) propylene glycol monostearate; and combinations of these. In surfactants based on polyethylene oxide, the number of polyoxyethylene units may range from about 5 to about 50, preferably from about 10 to about 40. Other examples of useful surfactants include, without limitation, polyoxyethylene (20) stearyl alcohol ether, polyoxyethylene (10) cetyl alcohol ether, polyoxyethylene (8) monolaurate, polyoxyethylene (20) glycerol monostearate, polyoxyethylene (16) lanolin alcohol ether, polyoxyethylene (5) sorbitan monolaurate, polyoxyethylene (15) tall oil fatty acid monoester, polyoxyethylene (24) cholesterol, polyoxyethylene (20) sorbitan monostearate, sucrose monolaurate, polyoxyethylene (30) sorbitan monostearate, polyoxyethylene (20) sorbitan monolaurate, polyoxyethylene (20) sorbitan monopalmitate, polyoxyethylene (20) cetyl alcohol ether, polyoxyethylene (40) monostearate, polyoxyethylene (25) soyasterol, and combinations of these. Surfactants having an HLB value of at least about 13, especially at least about 14.5, are particularly useful.

In a preferred embodiment, the surfactant is based on a non-toxic polyol, preferably a sugar compound, including the cyclic anhydride form of a sugar. Suitable examples of such base compounds include glycerol, dextrose, sorbitan, sorbitol, sorbose, xylopyranose, fructose, sucrose, glucose, galactose, arabinose, galactopyranonose, and combinations of these. In one preferred embodiment, the surfactant is based on sorbitol or sorbitan. The base sugar compound is esterified with a fatty acid or esterified or etherified with a fatty alcohol. A fatty acid or alcohol as used in accordance with the present invention is understood to have a hydrocarbyl group having at least about 9 carbons, and may be saturated or unsaturated. Preferably, the hydrocarbyl group may have up to about 36 carbons. More preferably, the hydrocarbyl group has from about 9 to about 18 carbon atoms. Suitable examples include pelargonic acid, pelargonic alcohol, lauryl alcohol, lauric acid, palmitic acid, oleic acid, linoleic acid, stearic acid, stearyl alcohol, cetyl alcohol, tridecyl alcohol, and combinations of these. Preferably, a monoester is formed, although diesters may also be used provided the HLB value of the resulting surfactant is at least about 13. The remainder of the alcohol groups of the esterified polyol are adducted with ethylene oxide to provide polyoxyethylene extensions. The total ethylene oxide units should be from about 5 to about 50, preferably from about 10 to about 40, more preferably from about 15 to about 30, yet more preferably from about 18 to about 25. Polyethoxylated sorbitan fatty acid esters are particularly preferred. Mixtures of such compounds may also be used.

The surfactant may be included in an amount of up to about 5% by weight of the play material. Preferably, at least about 0.1% by weight of the surfactant is included, based on the total weight of the play material. In a preferred embodiment, the surfactant is included in an amount of from about 0.5% to about 4% by weight, more preferably from about 1% to about 3% by weight, based on the weight of the play material.

The play material also includes at least one salt. Examples of suitable salts include alkali metal salts and alkaline earth metal salts, for example, without limitation, phosphates, sulfates, borates, chlorides, bicarbonates, acetates, propionates, and so on. Preferred are alkali phosphates and alkaline earth phosphates. Suitable examples include, without limitation, sodium aluminum sulfate, potassium aluminum sulfate, calcium sulfate, sodium chloride, sodium sulfate, sodium bicarbonate, sodium carbonate, calcium carbonate, potassium dihydrogen phosphate, monocalcium phosphate, dicalcium phosphate, tricalcium phosphate, dipotassium phosphate, monosodium phosphate, disodium phosphate, trisodium phosphate, borax, calcium propionate, sodium acetate, calcium oxide, potassium chloride, sodium benzoate, sodium sulfate, magnesium oxide, potassium dihydrogen phosphate, and combinations of these.

The salt may be included in an amount of up to about 5% by weight of the play material. Preferably, at least about 0.1% by weight of the salt is included, based on the total weight of the play material. In a preferred embodiment, the salt is included in an amount of from about 0.5% to about 4% by weight, preferably from about 1% to about 3% by weight, based on the weight of the play material.

The play material also includes a major portion of water. The water may advantageously be included in an amount of at least about 60 percent by weight of the play material, more preferably at least about 70 percent by weight of the play material, and even more preferably at least about 80 percent by weight of the play material. The water may be up to about 85 percent by weight of the play material, more preferably up to about 82 percent by weight of the play material. One preferred embodiment of the play material includes from about 78 percent to about 82 percent water by weight.

The play material can include other ingredients such as colorants. Especially preferred as colorants are nontoxic dyes such as food dyes, including vegetable dyes. A colorant that provides special color or visual effects may be included. Examples of colorants providing special color or visual effects include temperature-dependent colorants that change color or change from clear-to-colored with a change in temperature, light-dependent colorants that change color or change from clear-to-colored with a change in light or that fluoresce, iridescent and pearlescent colorants, and metallic pigments or sparkle flakes (i.e., glitter). Other pearlescing agents such as sulfonates and stearates may be included. Other pigment-like powders may be included to provide interesting or amusing properties, for example magnetic powder, as described in Clarke et al., U.S. Pat. No. 5,810,640. Dyes, pigments, special color or visual effects materials, and color concentrates are widely available and known in the art.

The play material may be scented with perfumes, fragrances, and the like. Other additives, such as humectants like glycerol and propylene glycol, preservatives, and lubricants and emollients such as mineral oil or wax.

The play material of the invention is remarkably stretchable can be drawn in one direction or in two directions to many times its original dimension without breaking apart or pulled into a thin film. If pulled quickly, however, the material will break apart. The play material also bounces. The ingredients of the composition can be varied to provide the desired tactile properties and degree of extensibility desired.

The present invention further provides a play kit that includes a portion of a play material according to the invention and a container for the play material. The play kit may contain the play material and the container as separate components or may be packaged with the play material insider of the container. In a further embodiment, the play kit contains two or more differently colored and/or differently scented portions of play material.

In a different aspect, the play material of the present invention includes one or more inserts suspended in a transparent play material matrix. The inserts are distinct from the play material matrix and have a composition different from the play material matrix. The play material matrix may be a gel, and preferably is the gel play material already described above in detail. The play material matrix may also be any other transparent gel known to be useful as a play material, including those described and referenced in Cordova, U.S. Pat. No. 5,990,205; Clarke et al., U.S. Pat. No. 5,810,640; Shapero, U.S. Pat. No. 5,506,290; Shapero et al., U.S. Pat. No. 5,310,421; Shaperoetal., U.S. Pat. No. 5,258,068; Cane, U.S. Pat. No. 4,735,660; Lester et al., U.S. Pat. No. 4,076,547; Dean et al., U.S. Pat. No. 3,661,790; Dean et al., U.S. Pat. No. 3,634,280, each of these and the references cited therein being incorporated herein by reference in its entirety.

The density of the insert should be about equal to or less than the density of the gel. Preferably, the density of the insert is within about 10%, more preferably within about 5%, and still more preferably within about 2% of the density of the gel play material. Thus, if the density of the gel material is 1 gram/cc, the density of the insert material is preferably from about 0.90 to about 1.10 gram/cc, more preferably from about 0.95 to about 1.05 g/cc, and still more preferably from about 0.98 to about 1.02 g/cc.

The inserts are preferably made of a plastic, and more preferably of a soft plastic or a flexible plastic. In one embodiment, the insert is preferably deformable. In a preferred embodiment, the inserts are composed of a thermoplastic elastomer. Thermoplastic elastomers have an A-B-A block copolymer structure in which the A block is a hard segment and the B block is a soft or elastomeric segment. Examples of suitable hard segments A include, without limitation, polystyrene, poly (alpha-methylstyrene), polyethylene, polyurethane, polyester, and polycarbonate. Examples of suitable soft or elastomeric segments B include, without limitation, polybutadiene, polyisoprene, poly(ethylene-co-butylene), polydimethylsiloxane, polyester, polyether, and EPDM.

Examples of suitable thermoplastic elastomers include, without limitation, poly (styrene-b-elastomer-b-styrene) block copolymers such as styrene/butadiene A-B-A block copolymer (SBS), styrene/isoprene A-B-A block copolymer (SIS), and styreneethylene-butylene A-B-A block copolymer (S-EBS); propyleneethylene-propylene block copolymer; thermoplastic polyurethane elastomers; and thermoplastic polyester elastomers.

The insert may also be made of a rubber, including natural rubber and synthetic rubbers such as silicone elastomers.

More than one insert may be included in the play gel. The inserts may have two or more different forms or shapes, and the shapes may be flat or three-dimensional. The inserts may be of different colors and may have special color effects, such as having a metallic or pearlescent color produced by including flake pigments and pearlescing materials in the plastic or rubber form which the are formed, and other effects, such as magnetic or fluorescent properties. The inserts may also be formed from either opaque or transparent materials.

When multiple inserts are included in the play materials, the inserts may have related or themes shapes. For example, two or more inserts in the form or stars, planets, or other heavenly bodies may be used. Other examples include a set of inserts shaped like different items of food, a set of inserts that are colored red and shaped like different things that are red (e.g., apple, rose, cherry), a set of inserts shaped like things that fly, like birds, insects, airplanes, and spacecraft. Likewise, the inserts and/or the gel may be colored to reflect a single theme. For example, fluorescent star-shaped inserts may be used with a transparent midnight blue gel. It is also contemplated that the inserts and/or the gel can be scented to correspond to a chosen theme. For example, inserts in the shape of fruits may be scented with fruit flavors or inserts shaped like different flowers can be scented like the flowers.

The gel with one or more inserts may be placed in a container. The container is preferably shaped or decorated according to a theme. For example, and without limitation, in the previous example of fruit-shaped inserts, the container may be shaped in the form of a lunchbox or inserts shaped like picnic items can be used with a container shaped like a picnic basket.

The gel, inserts, and optionally a container may be packaged together. The inserts may be package in the gel or separately from the gel. In addition, when the inserts have different shapes relating to a single theme, the inserts may be in two or more groups related to separate themes. For example, the previously described example of a set of fruit-shaped inserts may be included in a package with a set of vegetable-shaped inserts.

The invention is illustrated by the following example. The example is merely illustrative and does not in any way limit the scope of the invention as described and claimed. All parts are parts by weight unless otherwise noted.

EXAMPLE 1

Preparation of a Play Material According to the Invention

A gel is formed by mixing together 80 parts by weight of water, 15 parts by weight of a polyvinyl alcohol, 1 part by weight of Yellow Pantone No. 349C, 2 parts by weight of polyoxyethylene (20) sorbitan monooleate, and 2 parts by weight of monocalcium phosphate.

EXAMPLE 2

Preparation of a Play Material According to the Invention

Three inserts are inserted into the Play Material of Example 1. The inserts are made from styrene/ethylene-butylene A-B-A block copolymer. Each insert is approximately three-quarters of an inch long and about one-quarter of an inch thick. The inserts are shaped like a partially eaten sandwich, a turkey drumstick, and a block of Swiss cheese.

EXAMPLE 3

Preparation of a Toy According to the Invention

The play material of Example 2 is inserted into a container shaped like a refrigerator.

EXAMPLE 4

Preparation of a Toy According to the Invention

The play material of Example 1 is packaged with the set on inserts described in Example 2 and an additional set of three inserts of approximately the same sizes as the first set, but shaped like a can of soda, a carton of milk, and a juice box. The package also includes a container shaped like a refrigerator. The sandwich is colored yellow, the drumstick is colored brown, the Swiss cheese is a cream color, the can is colored a yellow green, the carton is colored red, and the juice box is colored purple. In addition, the sandwich has a ham scent, the can has a lemon-lime scent, and the juice box has a grape scent.

The invention has been described in detail with reference to preferred embodiments thereof. It should be understood, however, that variations and modifications can be made within the spirit and scope of the invention and of the following claims.

What is claimed is:

1. A play material, comprising water, poly(vinyl alcohol), a surfactant, and a salt.
2. A play material according to claim 1, wherein the surfactant comprises a polyethoxylated, fatty acid monoester of a sugar compound.
3. A play material according to claim 1, wherein the surfactant comprises a polyethoxylated, fatty acid monoester of sorbitan.
4. A play material according to claim 1, wherein the surfactant is a polyethoxylated sorbitan monooleate.
5. A play material according to claim 1, wherein the salt comprises a phosphate salt of an alkali metal or of an alkaline earth metal.
6. A play material according to claim 1, wherein the salt comprises monocalcium phosphate.
7. A play material according to claim 1, wherein the polyvinyl alcohol has a degree of hydrolysis of at least about 87% and a weight average molecular weight of at least 50,000.
8. A play material according to claim 1, further comprising a colorant.
9. A play material according to claim 1, further comprising a nontoxic dye.
10. A play material according to claim 1, wherein the water is included in an amount of at least about 70% by weight of the play material.
11. A play material according to claim 1, further comprising a temperature- or light-dependent colorant.
12. A play material according to claim 1 that is scented.
13. A play material according to claim 1, further comprising a magnetic powder.
14. A play material according to claim 1, further comprising a material that provides an effect selected from the group consisting of fluorescence, iridescence, pearlescence, metallic appearance, and sparkle.
15. A toy, comprising a plurality of play materials according to claim 1 of different colors.
16. A play material, comprising a transparent play material matrix and at least one insert suspended in the matrix, wherein the insert has a composition different from the matrix.
17. A play material according to claim 16, wherein the matrix is a gel.
18. A play material according to claim 16, wherein the insert is deformable.
19. A play material according to claim 16, wherein the insert comprises a thermoplastic elastomer.
20. A play material according to claim 16, comprising at least two inserts.
21. A play material according to claim 19, wherein the inserts have at least two different shapes.
22. A play material according to claim 21, wherein the forms of the inserts have shapes related to a theme.
23. A play material according to claim 22, wherein the play material has a scent or color related to the shapes of the inserts.
24. A play material according to claim 16, wherein the insert is opaque.
25. A play material according to claim 16, wherein the insert is fluorescent.
26. A play material according to claim 17, wherein the insert includes a pearlescing agent or metallic pigment.
27. A play material according to claim 16, wherein the insert is magnetic.
28. A play material according to claim 16, wherein the transparent play material matrix comprises water, poly(vinyl alcohol), a surfactant, and a salt.
29. A toy, comprising a transparent play material, a container for said play material, and a plurality of inserts suspendable in said play material.
30. A toy according to claim 29, wherein said container and said inserts have shapes related to a theme.
31. A toy according to claim 29, wherein said inserts are suspended in said play material.
32. A toy according to claim 29, including at least two sets of inserts that together with the container are related to a theme, wherein each set of inserts is related to a distinct sub-theme.
33. A toy according to clam 29, wherein said play material is scented.
34. A toy according to claim 29, wherein the transparent play material comprises water, poly(vinyl alcohol), a surfactant, and a salt.
35. An aqueous play gel composition comprising:
    poly(vinyl alcohol) in an amount between about 1 and 30 weight percent;
    a surfactant in an amount between about 0.5 and 4 weight percent;
    salt in an amount between about 0.5 and 4 weight percent; and
    water in an amount of at least 60% by weight.
36. The composition of claim 35, wherein the poly(vinyl alcohol) has a degree of hydrolysis of at least 79%.
37. The composition of claim 35, wherein the polyvinyl alcohol has a weight average molecular weight from between 10,000 and 200,000.
38. The composition of claim 35, wherein the surfactant is selected from the group consisting of soy lecithin, polyoxyethylene, monoesters of fatty acids, polyoxyethylene ethers of fatty alcohols, polyethoxylated sorbitan esthers, polyoxyethylene ethers of monoesters, and combinations thereof.
39. The composition of claim 35, wherein the surfactant is based on polyoxyethylene oxide and the number of polyoxyethylene units is an amount from between about 5 and 50.
40. The composition of claim 35, wherein the surfactant is based on a non-toxic polyol sugar compound.
41. The composition of claim 35, wherein the surfactant is based on one of sorbitan and sorbitol.
42. The composition of claim 35, wherein the surfactant is based on a base sugar compound which is either etherified with a fatty acid or etherified with a fatty alcohol.

43. The composition of claim 35, wherein the salt is selected from the group consisting of alkali metal salts and alkaline earth metal salts.

44. The composition of claim 35, wherein the salt is selected from the group consisting of alkali phosphates and alkalin earth phosphates.

45. The composition of claim 35, wherein the polyvinyl alcohol is present in an amount between about 10 and 20 weight percent, the surfactant is present in an amount between about 1 and 3 weight percent, and the salt is present in an amount between about 1 and 3 weight percent.

46. The composition of claim 35, wherein water is present in an amount between about 78 and 82 weight percent.

* * * * *